United States Patent
Fairchild et al.

(10) Patent No.: US 9,863,555 B2
(45) Date of Patent: Jan. 9, 2018

(54) STICK-ON HANGERS FOR LAYFLAT DUCTING SYSTEM

(71) Applicants: Troy T Fairchild, Overland Park, KS (US); Timothy R Anderson, Olathe, KS (US)

(72) Inventors: Troy T Fairchild, Overland Park, KS (US); Timothy R Anderson, Olathe, KS (US)

(*) Notice: Subject to any disclaimer, the term of this patent is extended or adjusted under 35 U.S.C. 154(b) by 0 days.

(21) Appl. No.: 15/044,472

(22) Filed: Feb. 16, 2016

(65) Prior Publication Data
US 2017/0234461 A1  Aug. 17, 2017

(51) Int. Cl.
| F16B 47/00 | (2006.01) |
|---|---|
| F16L 3/14 | (2006.01) |
| F16L 3/24 | (2006.01) |
| F16L 3/00 | (2006.01) |

(52) U.S. Cl.
CPC .............. *F16L 3/14* (2013.01); *F16B 47/003* (2013.01); *F16L 3/24* (2013.01); *F16L 3/00* (2013.01)

(58) Field of Classification Search
USPC ........ 248/683, 693, 317, 309.1, 467, 49, 53, 248/58, 60, 61, 62, 63; 40/702, 594; 285/425, 61
See application file for complete search history.

(56) References Cited

U.S. PATENT DOCUMENTS

| 1,687,859 | A | * | 10/1928 | Fontaine | ................. | B42F 15/06 |
|---|---|---|---|---|---|---|
| | | | | | | 206/806 |
| 4,962,757 | A | | 10/1990 | Stefan | | |
| 5,147,322 | A | | 9/1992 | Bowen et al. | | |
| 5,304,146 | A | | 4/1994 | Johnson et al. | | |
| 6,769,541 | B1 | | 8/2004 | Carriere | | |
| 6,994,307 | B2 | * | 2/2006 | Curtsinger | ............. | B23D 59/00 |
| | | | | | | 206/806 |
| 7,762,398 | B2 | | 7/2010 | Tokie et al. | | |
| 2003/0170399 | A1 | * | 9/2003 | Owed, Jr. | ............... | B05B 5/082 |
| | | | | | | 427/458 |
| 2006/0006300 | A1 | * | 1/2006 | Reason | ................ | A63B 55/408 |
| | | | | | | 248/303 |
| 2013/0043156 | A1 | * | 2/2013 | Glass | .................... | A47F 5/0006 |
| | | | | | | 206/449 |

* cited by examiner

*Primary Examiner* — Alfred Wujciak
(74) *Attorney, Agent, or Firm* — Law Office of John McMahon

(57) ABSTRACT

An system for drying a wet area of a building includes an elongated flexible duct and a plurality of hanger structures engaged with the duct at locations spaced therealong. Each hanger structure includes a connector tab adapted for engagement with a suspension member and a pair of diverging adhesive panels for adhesive engagement with the duct. The suspension members engage ceiling members to support the duct from an air source to the wet area.

13 Claims, 2 Drawing Sheets

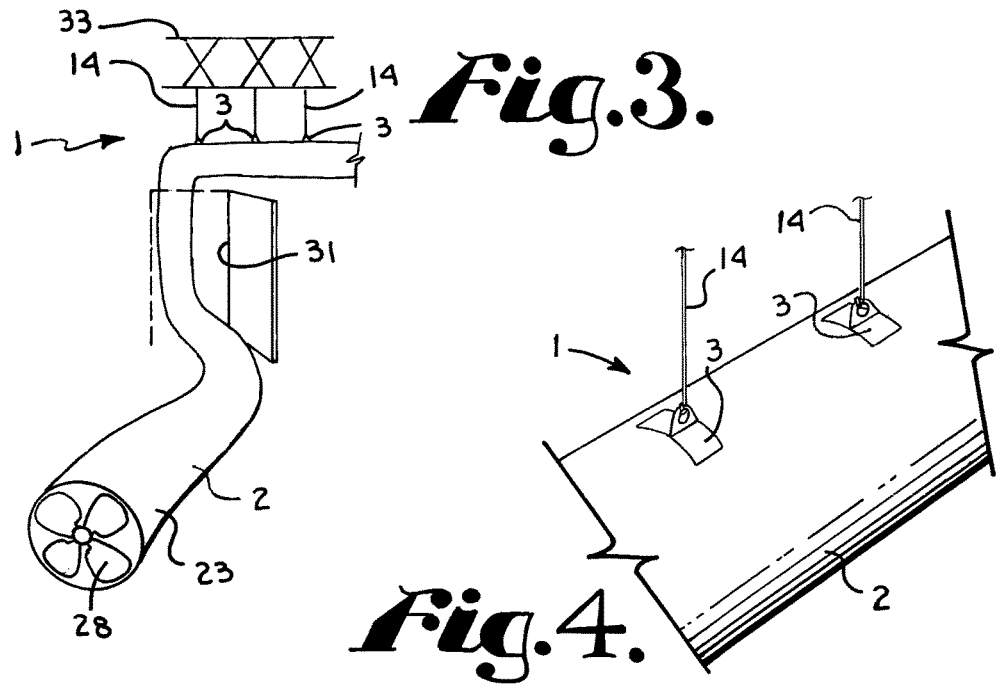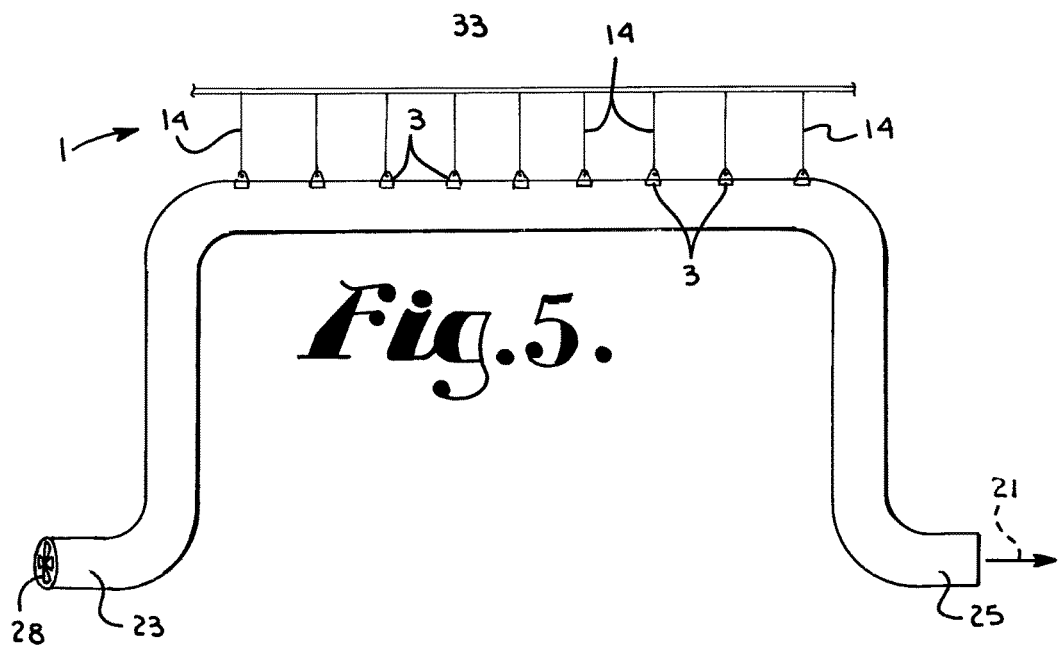

STICK-ON HANGERS FOR LAYFLAT DUCTING SYSTEM

BACKGROUND OF THE INVENTION

The present invention is broadly concerned with improvements in equipment for quickly drying previously flooded areas of a building and, more particularly, to hanger structures for supporting temporary ducting for such activity.

When an area of a building such as a commercial building is flooded, as by spillage, a ruptured water pipe, a roof leak, the application of water for fire suppression, or the like, it is necessary to quickly drain and dry such an area to avoid further damage from standing water, corrosion, fungal growth, and the like.

A common technique for drying such an area is to direct a drying airflow toward the wet area by means of temporary ducting suspended from ceiling supports and extending from a fan/heater unit to the area to be dried. The fan unit may be placed outdoors. The ducting may have branches to direct the drying airflow to multiple areas. Typically, the ducting is supported by lengths of wire or rope or other structures connected to existing ceiling trusses or beams. The wire or rope sections are secured to the ducting by common duct tape. The type of ducting structure used is known as "layflat" tubing material.

Layflat tubing, also known as lay flat tubing or LFT, is a continuous length of a seamless, tubular, flexible, polymer film which is manufactured by the packaging industry and which is usually provided in a continuous flat form on rolls. Because of its flexibility, it is referred to as layflat tubing. One of the most common uses of layflat tubing is in heat sealed packaging, as for foods and other products. The use of duct tape to install the temporary ducting is time consuming and laborious, such that the application of a drying airflow to the wet area is delayed.

SUMMARY OF THE INVENTION

The present invention provides embodiments of an improved apparatus for drying a wet area of a building using hanger structures according to the present invention. The drying apparatus generally includes an elongated flexible duct or ducting member supported by suspension members from ceiling members. The suspension members are engaged with the ducting member by a plurality of spaced apart hanger structures.

An embodiment of the hanger structure for supporting the ducting member from a suspension member includes: a connector tab adapted for engagement with a suspension member; a pair of flexible adhesive panels extending from the connector tab, the panels having respective inner surfaces and outer surfaces; each of the adhesive panels having an adhesive on a respective inner surface thereof; and the panels being angularly separable to enable adhesive engagement of the inner surfaces thereof with a ducting member.

In an embodiment of the present invention, the hanger structure is formed by a pair of layers, each layer having a tab end and a panel end. The tab ends of the layers are joined to form the connector tab. The panel ends of the layers form the adhesive panels, and the adhesive panels are angularly flexible relative to the connector tab. Inner surfaces of the adhesive panels may have respective release sheets removably positioned thereon which are removed prior to adhesively engaging the panels to the ducting member.

The connector tab may include an opening formed therethrough to facilitate engagement of a suspension member therewith. The opening may simply be an aperture formed through the connector tab or may, alternatively be of a shape which forms the connector tab into a hook. An edge forming the opening may be reinforced, as by thickening of material about the opening or by shaping of material forming the tab in such a manner as to reinforce the edge of the opening. Alternatively, the opening of the connector tab may have a grommet positioned therein for reinforcement thereof.

An embodiment of the present invention includes the combination of an elongated flexible ducting member and one or more hanger structures to engage corresponding suspension members and including: a connector tab adapted for engagement with a suspension member; a pair of flexible adhesive panels extending from the connector tab, the panels having respective inner surfaces and outer surfaces; each of the adhesive panels having an adhesive on a respective inner surface thereof; and the panels being angularly separable to enable adhesive engagement of the inner surfaces thereof with a ducting member. A plurality of the hanger structures may have the adhesive panels thereof adhesively engaged with the ducting member at spaced apart locations therealong.

The hanger structure according to the present invention may be formed from a material such as a polymer film which may be recycled or which is biodegradable. Similarly, the flexible ducting member may be formed from a recyclable or biodegradable polymer film. It is also foreseen that the hanger structure could be formed of a type of paper or of a laminate of a paper and a polymer film.

An embodiment of the present invention includes a method for drying a wet area of a building having ceiling members and comprising the steps of: extending an elongated flexible ducting member from a source of drying air to a wet area of a building, the ducting member having a source end at a source of drying air and an exit end at a wet area of a building; suspending a plurality of suspension members from ceiling members at spaced locations along the ducting member; adhesively engaging a plurality of hanger structures to the ducting member at longitudinally spaced locations thereof, each hanger structure including: a connector tab adapted for engagement with a suspension member; a pair of flexible adhesive panels extending from the connector tab, the panels having respective inner surfaces and outer surfaces; each of the adhesive panels having an adhesive on a respective inner surface thereof; and the panels being angularly separable to enable adhesive engagement of the inner surfaces thereof with a ducting member; engaging the connector tab of each hanger structure with a respective suspension member to support a portion of the ducting member from the ceiling members; forcing air into the ducting member at the source end thereof; and directing the exit end of the duct toward a wet area to apply air thereto to dry such a wet area.

Various objects and advantages of the present invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

BRIEF DESCRIPTION OF THE DRAWINGS

FIG. 3 is a diagrammatic perspective view at a reduced scale of a layflat ducting member supported from a building ceiling structure by suspension members connected to the ducting member by hanger structures according to the present invention.

FIG. 4 is a an enlarged fragmentary perspective view of the layflat ducting member supported by a pair of hanger structures of the present invention.

FIG. 5 is a diagrammatic side elevational view of the layflat ducting member supported from a building ceiling by suspension members connected to the ducting member by hanger structures of the present invention.

DETAILED DESCRIPTION OF THE INVENTION

Figure 1:
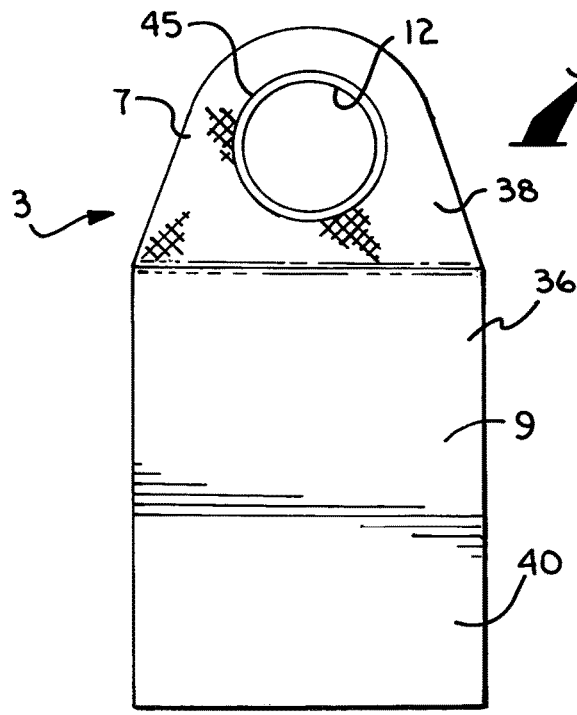
FIG. 1 is a side elevational view of a stick-on hanger structure according to the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates an embodiment of an improved drying system for drying a wet area of a building. The system 1 generally includes an elongated flexible ducting member 2 (FIGS. 3-5) and a plurality of hanger structures 3 which cooperate to conduct drying air to the area to be dried.

Figure 2:
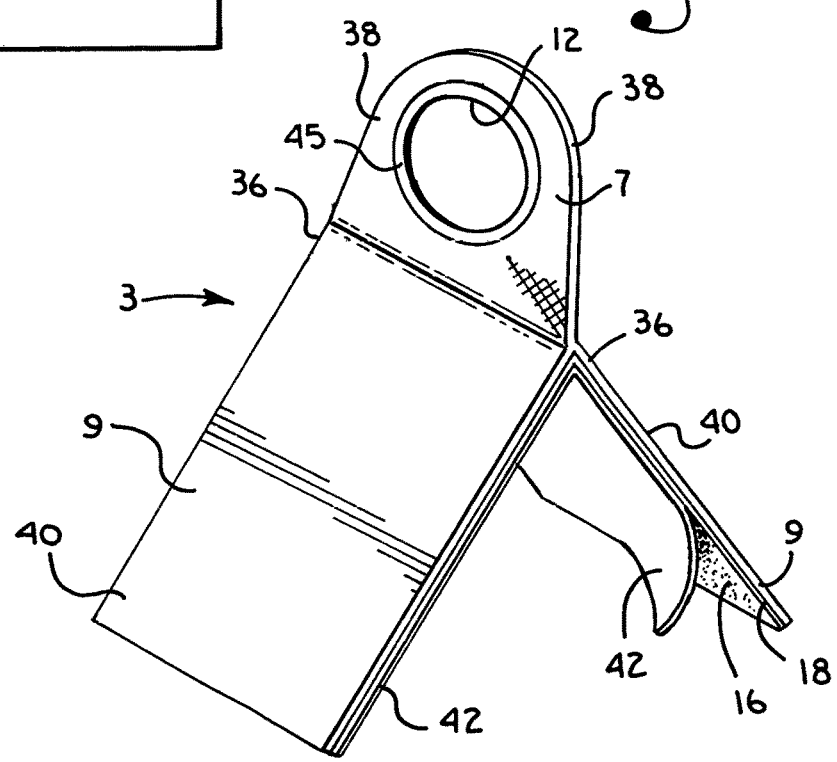
FIG. 2 is a perspective view of the hanger structure with adhesive panels shown in an angularly spread condition.

Referring to FIGS. 1 and 2, an embodiment of the hanger structure 3 includes a hanger body or connector tab 7 with a pair of adhesive panels 9 diverging therefrom. The connector tab 7 has an opening 12 formed therethrough to enable engagement or connection with a suspension member 14 (FIGS. 3-5) as will be detailed further below. Each of the adhesive panels 9 has an adhesive material or adhesive 16 applied to inner surface 18 thereof. In general, the adhesive panels 9 are spread apart and the inner surfaces 18 thereof are adhesively engaged with an outer surface of the ducting member 2 to enable the ducting member 2 to be supported by the suspension members 14.

The ducting member or duct 2 is an elongated flexible tubular member which is employed to transfer a stream 21 (FIG. 5) of drying air from an air source end 23 of the duct 2 to an exit end 25 thereof. The source end 23 of the duct 2 is positioned in communication with an air source 28, such as a fan, and extended to a wet area to be dried by the air stream 21 issuing from the exit end 25 of the duct 2. The air source 28 may be placed outside of the building 31 in which the wet area is located or, alternatively, at a dry area of the building 31. The air source or fan 28 may be a heavy duty fan which is portable or which is mounted on a structure (not shown) which can be moved, as by a forklift.

The duct 2 is supported from the source end 23 to the exit end 25 by the suspension members 14 which may be connected to ceiling structural members 33 of the building 31, such as trusses, beams, or the like. The suspension members 14 may be elements such as ropes, wires, bungee cords, or the like which are engaged with the openings 12 of the connector tabs of the hanger structures 3 to support the duct 2.

The ducting member 2 is preferably an elongated light weight, flexible tubular member and may be a product referred to generally as "layflat" or lay flat tubing. The term refers to a continuous, seamless, tubular polymer tubing which is typically supplied in rolls. Layflat tubing is often used in heat sealed packaging of products. The pressure of air from the source 28 inflates the duct 2. Therefore, ducting member 2 is formed of a material which can withstand the pressure of air moving therethrough without rupturing. The ducting member 2 may be formed of a material which is capable of being recycled or which is biodegradable. Although the duct 2 is illustrated as a single run of ducting, it is foreseen that additional runs of ducting may be joined or spliced into a trunk duct 2 to enable drying multiple areas. Junctions of such branch ducts (not shown) may be made by cutting into the duct 2 and joining additional ducts, as by the use of tape.

The illustrated hanger structure 3 is formed by a pair of hanger layers 36, each layer including a tab end 38 and a panel end 40. The tab ends 38 are joined to form the connector tab 7, as by an adhesive, by heat lamination, or the like. Each of the panel ends 40 forms an adhesive panel 9 and has the adhesive 16 applied to the inner surface 18 thereof. As illustrated, each inner surface 18 has a release sheet 42 positioned on the adhesive surface to prevent the panels 9 from sticking together. The release sheets 42 are removed from the panels 9 prior to adhering them to the ducting member 2. The release sheets 42 may be individual sheets. However, it is foreseen that the release sheets 42 may be joined at an end near the connector tab 7 to form a single release sheet 42.

On the illustrated connector tab 7, the opening 12 is shown as a circular aperture. It is also foreseen that the opening 12 could, alternatively, could have a shape as to give the connector tab 7 the form of a hook (not shown). The edge forming the opening 12 may be provided with a reinforcement 45 to resist excessive deformation or tearing of the connector tab 7. The reinforcement 45 may be in the formed of a thickening of the tab layer 38 about the opening 12 or by molding the tab layer 38, as during lamination of the tab layers 38, to provide a radial shape which strengthens the tab 7 about the opening 12. The reinforcement 45 may also be provided in the form of a grommet which is inserted within the opening 12 about the edge thereof.

The layers 36 of the hanger structure 3 may be formed of a type of paper or of a polymer film such as vinyl, polyvinyl chloride, polyurethane, or the like. It is also foreseen that layers 36 may be formed reinforced by a fabric, by fibers, or by paper or foil layers which are laminated therewith.

It is to be understood that while certain forms of the present invention have been described and illustrated herein, it is not to be limited to the specific forms or arrangement of parts described and shown.

The invention claimed is:

1. In combination a hanger structure and an elongate flexible ducting member through which gases, including air and water vapor, are conveyed during use, the hanger structure operably supporting the ducting member from a suspension member and comprising:
   (a) a connector tab adapted for engagement with the suspension member; the tab including an enclosed opening therethrough formed by a continuous edge of the tab;
   (b) a pair of flexible adhesive panels extending from the connector tab, the panels having respective inner surfaces and outer surfaces;

(c) each of the adhesive panels having an adhesive on a respective inner surface thereof; and (d) the panels being angularly separable to enable adhesive engagement of the inner surfaces thereof with the ducting member.

2. A structure as set forth in claim 1 and including:

(a) each of the adhesive panels having a release sheet removably positioned thereon, each release sheet being removable from the associated adhesive panel to enable adhering the adhesive panel to the flexible ducting member.

3. A structure as set forth in claim 1 and including:

(a) a reinforcement extending about the edge forming the opening.

4. A structure as set forth in claim 1 and including:

(a) a pair of layers, each layer having a tab end and a panel end;

(b) the tab ends of the layers being joined to form the connector tab;

(c) the panel ends of the layers forming the adhesive panels; and (d) the adhesive panels being angularly flexible relative to the connector tab.

5. A structure as set forth in claim 1 wherein:

(a) the adhesive panels of the hanger structure are adhered to the ducting member; and (b) the connector tab of the hanger structure is engaged with the suspension member.

6. A hanger structure in combination with an elongated flexible ducting member for conveying gases, including air and water vapor, the hanger structure operably supporting the ducting member from a suspension member, the hanger structure comprising:

(a) a pair of hanger layers, each layer having a tab end and a panel end; the tab having an opening therethrough formed by a continuous surrounding structure;

(b) the tab ends of the layers being joined to form a connector tab;

(c) an edge forming the opening through the connector tab to facilitate engagement of the structure with the suspension member;

(d) the panel ends of the layers forming adhesive panels extending from the connector tab, the panels being flexible and having respective inner surfaces and outer surfaces;

(e) each of the adhesive panels having an adhesive on a respective inner surface thereof; and (f) the panels being angularly separable to enable adhesive engagement of the inner surfaces thereof with the ducting member.

7. A structure as set forth in claim 6 and including:

(a) each of the adhesive panels having a release sheet removably positioned thereon, each release sheet being removable from the associated adhesive panel to enable adhering the adhesive panel to the flexible ducting member.

8. A structure as set forth in claim 6 and including:

(a) a reinforcement extending about the edge forming the opening.

9. A structure as set forth in claim 6 and including:

(a) a grommet positioned within the opening to reinforce the edge forming the opening.

10. A structure as set forth in claim 6 wherein:

(a) the adhesive panels of the hanger structure are adhered to the ducting member; and (b) the connector tab of the hanger structure is engaged with the suspension member.

11. A hanger structure in combination with an elongated flexible ducting member operably conveying gases, including air and water vapor, the hanger structure supporting the ducting member from a suspension member, the hanger structure comprising:

(a) a pair of hanger layers, each layer having a tab end and a panel end;

(b) the tab ends of the layers being joined to form a connector tab;

(c) a continuous edge forming an enclosed opening through the connector tab to facilitate engagement of the structure with the suspension member;

(d) a reinforcement extending about the edge forming the opening;

(e) the panel ends of the layers forming adhesive panels extending from the connector tab, the panels being flexible and having respective inner surfaces and outer surfaces;

(f) each of the adhesive panels having an adhesive on a respective inner surface thereof;

(g) each of the adhesive panels having a release sheet removably positioned thereon, each release sheet being removable from the associated adhesive panel to enable adhering the adhesive panel to the flexible ducting member; and (h) the panels being angularly separable to enable adhesive engagement of the inner surfaces thereof with the ducting member.

12. A structure as set forth in claim 11 wherein:

(a) the adhesive panels of the hanger structure are adhered to the ducting member; and (b) the connector tab of the hanger structure is engaged with a suspension member.

13. A structure as set forth in claim 11 wherein the reinforcement includes:

(a) a grommet positioned within the opening to reinforce the edge forming the opening.

\* \* \* \* \*